United States Patent
Baker et al.

(10) Patent No.: US 8,321,834 B2
(45) Date of Patent: Nov. 27, 2012

(54) FRAMEWORK FOR AUTOMATICALLY MERGING CUSTOMIZATIONS TO STRUCTURED CODE THAT HAS BEEN REFACTORED

(75) Inventors: Bruce R Baker, Markham (CA); Walfrey Ng, Markham (CA); Chenfei Song, Markham (CA); Yu Yuan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 12/238,135

(22) Filed: Sep. 25, 2008

(65) Prior Publication Data

US 2010/0077380 A1    Mar. 25, 2010

(51) Int. Cl.
*G06F 9/44*    (2006.01)
(52) U.S. Cl. ........ 717/107; 717/108; 717/109; 717/111; 717/116
(58) Field of Classification Search .......................... None
See application file for complete search history.

(56) References Cited

U.S. PATENT DOCUMENTS

| | | | |
|---|---|---|---|
| 6,434,547 B1 | 8/2002 | Mishelevich et al. | |
| 7,926,033 B2 | 4/2011 | Gopal et al. | |
| 2006/0041579 A1 | 2/2006 | Miyashita et al. | |
| 2009/0254971 A1 | 10/2009 | Herz et al. | |
| 2010/0077380 A1 | 3/2010 | Baker et al. | |
| 2010/0088676 A1* | 4/2010 | Yuan et al. | 717/120 |
| 2011/0167154 A1 | 7/2011 | Bush et al. | |

OTHER PUBLICATIONS

Office Action—Non-Final for U.S. Appl. No. 12/238,080, filed Sep. 25, 2008; First Named Inventor: Yu Yuan; Art Unit: 2155; Mail Date: Jan. 6, 2012.

\* cited by examiner

*Primary Examiner* — Chuck Kendall
(74) *Attorney, Agent, or Firm* — Cantor Colburn LLP; Libby Toub (57) ABSTRACT

A method of generating a tool for merging customizations made to a first version of a software artifact when migrating to a second version includes instantiating a mapping element for each top-level element in a first code set that does not have a complementary element in a second code set; requesting and receiving merge instructions for each top-level element for which merge instructions are not provided in the corresponding mapping element; determining whether the merge instructions for each top-level element for which merge instructions are provided require that customizations be merged into the second code set; determining whether the merge instructions for each top-level element set that requires customizations to be merged are valid; requesting and receiving merge instructions for each top-level element for which the merge instructions are not valid; and storing the merge instructions received for each top-level element in the corresponding mapping element.

19 Claims, 5 Drawing Sheets

FRAMEWORK FOR AUTOMATICALLY MERGING CUSTOMIZATIONS TO STRUCTURED CODE THAT HAS BEEN REFACTORED

CROSS-REFERENCE TO RELATED APPLICATIONS

The present application is co-pending with the concurrently filed application, entitled "COMPARING AND MERGING STRUCTURED DOCUMENTS SYNTACTICALLY AND SEMANTICALLY," assigned to the assignee of the present application, the contents of which are incorporated herein by reference in their entirety.

BACKGROUND

Exemplary embodiments of the present invention relate to software maintenance, and more particularly, to revision control software tools that include merge capabilities.

Version control refers to the management of different versions and variants of data files and software. As software is developed, designed, and deployed, it is extremely common for multiple states, or versions, of the same software to be deployed in different sites, as well as for the software's developers to be working simultaneously on updates. Code reuse, which refers to the use of existing software to update software or implement new software, is based on the idea that a partial or complete computer program written at one time can be, should be, or is being used in another program written at a later time. Programmers have reused sections of code, templates, functions, and procedures from the earliest days of programming to save time and energy by reducing redundant development work. The most common type of reuse of is the reuse of software components, but other artifacts produced during the software development process such as system architecture, analysis models, design models, design patterns, database schemas, web services can also be reused. The general development practice of using a prior version of an extant program as a starting point for the next version is a standard form of code reuse.

A more typical example of code reuse is the topic of end-user development (EUD), which refers to activities or techniques that allow people who are not professional developers to create or modify a software artifact. EUD may be viewed as essentially out-sourcing the development effort to the end user. A common instance of EUD is programming to extend and adapt an existing application package (for example, an office suite). Two main reasons why EUD has become popular are because organizations can use EUD to effectively cut the time of completion on a project and because software tools are more powerful and easier to use. A drawback with the implementation of EUD, however, is that it can increase the complexity of software maintenance, which generally involves the modification of a software product after delivery to correct faults, to improve performance or other attributes, or to adapt the product to a modified environment. In particular, where an end-user has made individual customizations to programming code, it is difficult for the original developer of that code to account for these customizations in considering the processes of implementation and product acceptance for the maintenance modifications.

SUMMARY

An exemplary embodiment of a method of generating a tool for merging customizations made to a first version of a software artifact when migrating to a second version of the software artifact includes instantiating a mapping information element in a first data store for each top-level data element in a first code set for the first version that does not have a complementary data element in a second code set for the second version; requesting merge instructions for each top-level data element in the first code set for which merge instructions are not provided in the corresponding mapping information element for the top-level data element; receiving merge instructions for each top-level data element in the first code set for which merge instructions are not provided; determining whether the merge instructions for each top-level data element in the first code set for which merge instructions are provided require that customizations made to the top-level data element be merged into the second code set; determining whether the merge instructions for each top-level data element in the first code set that requires customizations made to the top-level data element to be merged are valid; requesting merge instructions for each top-level data element in the first code set for which the merge instructions are not determined to be valid; receiving merge instructions for each top-level data element in the first code set for which the merge instructions are not determined to be valid; and storing the merge instructions received for each top-level data element in the first code set in the corresponding mapping information element in the first data store.

Exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof Exemplary embodiments of the present invention can be implemented to provide a mechanism that can be employed regularly during the software development cycle for monitoring changes made to the code of a current version of a software artifact during development of a new version of the software artifact and generating an automated tool providing solutions for merging customizations made by a third-party to the code of the current version for each instance where a data element is present in the current version of the software artifact but does not have a complementary data element in the new version of the software artifact. By providing solutions for merging customizations for each of these instances, exemplary embodiments can operate to generate a tool for automatically merging customizations made to data elements of the current version of a software artifact into a new version even where the code of the software artifact has been significantly refactored between versions. As used herein, the term "data element" refers to an atomic unit of data that includes an identification such as a data element name, a data element definition, and one or more representation terms.

As referred to herein, a data element that is present in a current version of a software artifact is said to not have a complementary data element in a new version of the software artifact where the data element no longer exists or is structured differently in the new version of the software artifact. More particularly, a data element that is present in a current version of a software artifact is said to not have a complementary data element in a new version of the software artifact where one of the following five differences between the current version and the new version is present: (1) the data element has been deleted between versions; (2) the data element exists in the same structured programming-language document as in the current version but is associated with a different parent element in the new version; (3) the data element exists in a different structured programming-language document and is associated with a different parent element in the new version; (4) the data element associated with the same parent element but exists in a different structured programming-language document in the new version; and (5) the data element has been renamed in the new version.

In exemplary embodiments, the tool generated for automatically merging customizations made to the code of a current version of a software artifact can provide a data store of merging solutions for reconciling customizations made to data elements that are present in the current version but do not have a complementary data element in the new version of the software artifact and an interface that is accessible by an automated data migration tool when performing code migration from the current version to a new version that services the merging solutions as dictated by the customizations made by the customer to the code of the current version. As used herein, the term "data store" refers to any suitable memory device that may be used for storing data, including manual files, machine readable files, and databases. Exemplary embodiments can implemented so that the tool generated for automatically merging customizations to the current version into the new version requires only a minimal amount of developer input, thereby significantly reducing development cost, even in situations where a significant amount of code refactoring has been performed between the release of the old version and the new version.

The mechanism for generating an automated tool that provides solutions for merging customizations made by a third-party to the code of the current version for each instance where a data element is present in the current version of the software artifact but does not have a complementary data element in the new version of the software artifact generally outlined above will be described in greater detail herein with reference to exemplary embodiments in which the software artifacts comprise structured documents in the form of XML documents that are not defined by an XML schema and are formatted according to semantic constraints to include a number of elements that may be ordered or unordered. It should, of course, be understood that this scenario is exemplary only, and that exemplary embodiments of the present invention can be implemented to provide a mechanism for generating an automated tool that provides solutions for merging customizations to software artifacts comprising structured documents of any type, not just XML-language documents. Exemplary embodiments can be applied to software artifacts comprising documents coded in a wide range of structured languages including, for example, HTML, WML, XHTML, DHTML, or other SGML derivatives, as well as other structured languages such as user interface markup languages (for example, UIML, XAL, SVG, XAML, and LZX), the programming languages Pascal and C, and languages used to define two- or three-dimensional layouts, structures, or integrated circuits. Exemplary embodiments can also be applied to software artifacts comprising documents coded in structured languages used for storing scientific information, engineering information, business information, games, cryptography, and other areas of information technology. A document written in a structured language will generally have a hierarchical structure of elements in which the structure is generally defined by tags (that is, sequences of characters in the document). Furthermore, exemplary embodiments can be implemented to be applied to for any suitable type of software artifact such as software components, system architectures, application packages, analysis models, design models, design patterns, database schemas, web services, and the like.

The XML standard is governed by the World Wide Web Consortium, and is maintained on the Internet at the web site of the World Wide Web Consortium (W3C). XML describes a class of data objects called XML documents and partially describes the behavior of computer programs which process them. An XML document is a structured, self-descriptive document having a collection of elements, and that facilitates some form of automatic semantic integration. Thus, as used herein, the terms "XML element" or "XML data element" refers to the code terms contained between a set of brackets as defined by the rules of XML. XML is classified as an extensible language because it allows users to define their own elements, which contain either parsed or unparsed data. Parsed data is made up of characters, some of which form character data, and some of which form markup. Each element may have a list of associated attributes and elements. An element may refer to other elements to cause their inclusion in the document. A document begins in a "root" or document element. Markup encodes a description of the document's storage layout and logical structure. Logically, the document is composed of declarations, elements, comments, character references, and processing instructions, all of which are indicated in the document by explicit markup. XML provides a mechanism to impose constraints on the storage layout and logical structure. By adding these semantic constraints, application languages can be implemented in XML.

The following example scenario involving the merging of software artifacts that include customizable XML documents for which no XML schema has been defined illustrates some of the issues that may arise during maintenance of the software artifacts that exemplary embodiments of the present invention can be implemented to address. In the example scenario, a software vendor initially produces 'version 1' of the code for an application package that includes a set of customizable XML documents. The XML documents are provided according to specified semantic constraints, but no XML schema is defined for the documents. A customer purchases version 1 of the application package and, understanding the semantics of the XML documents, customizes the application code by modifying elements of the XML documents. The customer may also define new elements for use in the customizable documents. The vendor then decides to enhance the application package by adding new functionality, some of which will be implemented through updates to the customizable XML documents.

Prior to updating the application, the vender decides to refactor the code for 'version 1' of the application package. Code refactoring, which is usually motivated by the difficulty of adding new functionality to a program or fixing a bug in it, refers to the process of changing programming code to make it amenable to change, improve its readability, or simplify its structure, while preserving its existing functionality, and is sometimes informally referred to as "cleaning it up." For example, code refactoring can be used to improve the understandability of code by changing its internal structure and design and removing dead code and other code bloat. An example of a trivial refactoring is changing the character sequence to used for an identifiers, for example, changing a variable name from a single letter 'i' to a more meaningful 'interestRate' character sequence.

After refactoring and adding new functionality to the code, the vender's code for the updated version of the application, 'version 2', is based on version 1. The customer then decides to upgrade to version 2 of the application. Because the user has customized the XML documents in version 1, to get the new features of version 2 without losing the customizations, the changes that were made by the customer to the XML documents for version 1 will need to be merged into the XML documents of version 2. Because of the refactoring, however, some elements that were present in version 1 may no longer exist or may be structured differently in version 2. As a result, elements of the code for version 1 of the application package that have been customized by the customer may no longer exist or be structured differently in version 2, and therefore, using prior art merging techniques, these customizations will need to be integrated manually. Exemplary embodiments of the present invention, however, can provide a tool for automatically merging customizations made to elements of the code for version 1 that no longer exist or are structured differently into version 2, even though the code of the application package has undergone refactoring between the two versions.

Exemplary embodiments of the present invention can be implemented to verify the correctness of the generated solutions for merging customizations made to the code of a current version of a software artifact into a new version by regularly performing validation on the solutions up until the release of the new version, which can provide a benefit in terms of post-release maintenance cost. This can be far less error-prone than requiring customers to manually re-implement their customizations after migrating to a new version or requiring developers to manually monitor updates to the code of the current version during development of the second version and document instructions to be followed by customers manually to merge their modifications to the current version code into the new version code after or during migration to the new version, particularly for situations where the software artifact is produced by a large development team and includes a large number of files.

Figure 1:
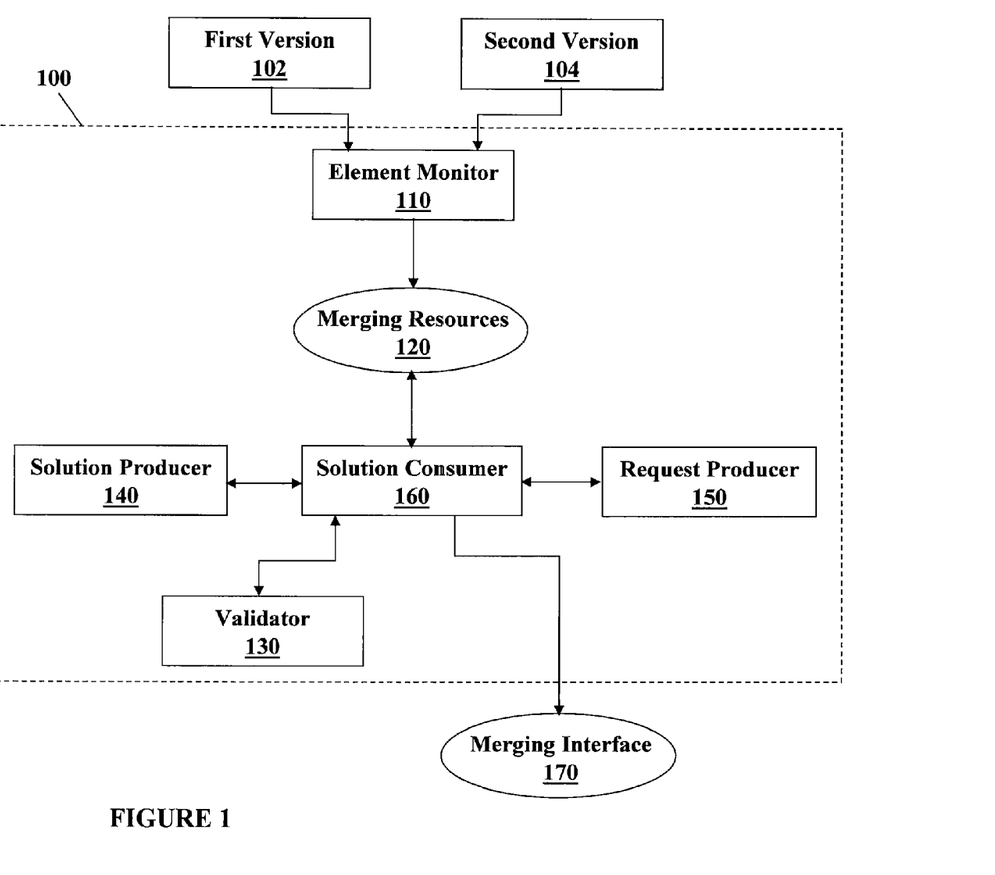
FIG. 1 is a block diagram illustrating an exemplary embodiment of a merge solution tool framework in accordance with the present invention.

Referring now to FIG. 1, an exemplary embodiment of a merge solution tool framework 100 in accordance with the present invention is illustrated. As will be described, merge solution tool framework 100 is implemented to monitor changes made to the XML code file of a current version of a software artifact that includes a set of customizable XML documents during development of the XML code file for a new version of the software artifact and generate an automated tool providing solutions for merging customizations made by a third-party to the customizable XML documents of the current version for each instance where an XML element that was present in the current version but does not have a complementary XML element in the XML documents for the new version of the software artifact. Merge solution tool framework 100 provides a mechanism that can be employed regularly during the software development cycle to continuously integrate changes made between versions by updating the merge solutions provided by the automated tool.

In the present exemplary embodiment, merge solution tool framework 100 includes a top-level element monitoring module 110, a merging resources module 120, a merge solution validator module 130, a merge solution producer module 140, a merge request producer module 150, a merge solution consumer module 160, and a merging interface producer module 170. As used herein, the terms "module" and "program module" both include routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of a machine embodying exemplary embodiments of a version comparison mechanism in accordance with the present invention. Aspects of the modules may be written in a variety of programming languages, such as C, C++, Java, etc. The functionality provided by the modules described with reference to exemplary embodiments described herein can be combined and/or further partitioned.

Generally, in the present exemplary embodiment, element monitor 110 is implemented to regularly monitor development to identify top-level (or parent) XML elements that are present in the current version of a software artifact and do not have a complementary XML element in the new version as the new version is being developed for release at a later date. An XML document contains a tree-based semantical structure that has exactly one root element. The top-level XML elements identified by element monitor, as will be described in greater detail below, are all the XML elements of the XML documents that are present in the current version of a software artifact and do not have a complementary XML element in the new version, and furthermore, have no ancestor elements in the tree-structures of the XML documents that do not have a complementary XML element in the new version.

Also generally, merging resources 120 is implemented to store customization mapping information for solutions for merging customizations made to each of the elements that no longer exist or are structured differently into the new version; validator 130 is implemented to receive the customization mapping information from merging resources 120 and perform validation of the customization mapping on the new version; solution producer 140 is implemented to automatically generate merging solutions for customizations made to descendent elements of parent elements identified by element monitor 110 for which the merge solution has been generated; request producer 150 is implemented to request and accept customization mapping information input from the developer for merging solutions for customizations made to each of the elements that do not have a complementary element in the new version for which merging solutions cannot either be generated by solution producer 140 or validated by validator 130; solution consumer 160 is implemented to read and process the customization mapping information from merging resources 120 to determine whether a merging solution for an element is provided by the mapping information and whether there is a need to generate a merging solution for the element; and merging interface 170 is implemented to provide an interface for providing the generated merge solutions in a manner that enables fully automated merging of customizations made to the current version of the software artifact during migration to the new version in a manner that requires far less developer input.

Figure 2:
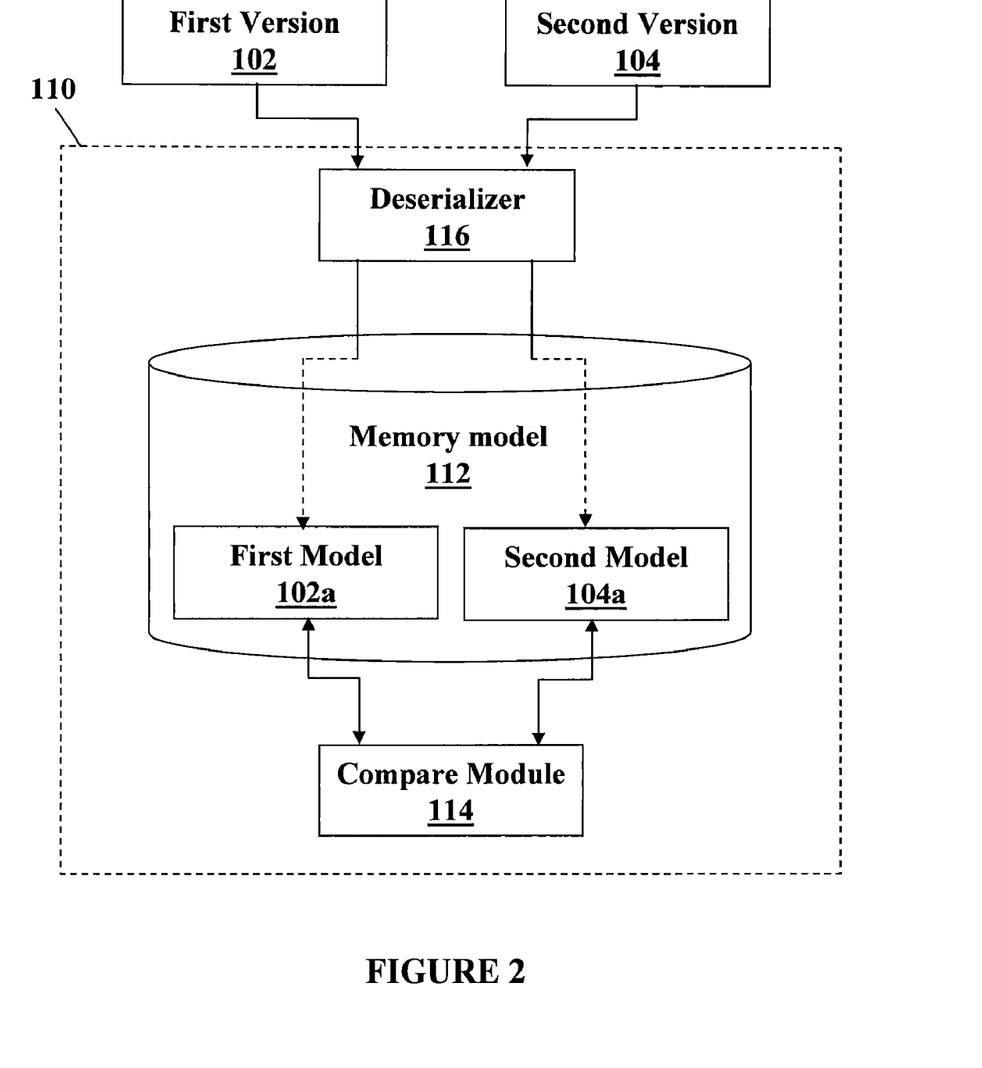
FIG. 2 is a block diagram illustrating the subcomponents of an exemplary embodiment of an element monitor of the exemplary merge solution tool framework of FIG. 1.

FIG. 2 provides a block diagram illustrating the subcomponents of element monitor 110 as implemented in the present exemplary embodiment in greater detail. In particular, element monitor 110 is configured to regularly load a first version 102 (for example, a current release) of a software artifact undergoing development and a modified second version 104 of the software artifact as presently updated by the development into a generic memory model data store 112. As will be described, element monitor 110 is implemented to generate a memory model representation of each version in generic memory model 112, to compare the two memory model representations of the three input document to identify the differences therebetween, and to update the memory model to include information regarding the identified differences between the two documents. More particularly, element monitor 110 is implemented with a version compare module 114 that is configured to access data store 112 to perform a comparison between first version 102 and second version 104 to identify parent code elements that are present in the first version and for which there is not a complementary element in the second version.

In the present exemplary embodiment, element monitor 110 is implemented with a deserializer 116 that is configured to deserialize first version 102 and second version 104 to generate and store a memory model representation of each version into memory model 112. Each memory model representation takes the form of a hierarchical, node-labeled tree data structure. A tree data structure, which is an acyclic and connected graph having a set of linked nodes, is commonly used for representing XML documents, which utilize a tree-based semantical structure that has exactly one root element. Trees may be manipulated in more complex ways than ordered lists of text lines. For instance, in the present exemplary embodiment, the tree-structured memory model representations of the documents can each include a number of ordered and/or unordered nodes. Each node in a tree has zero or more child nodes, which are below it in the tree (by convention, trees grow down, not up as they do in nature). A node that has a child is called the child's parent node (or ancestor node, or superior). The topmost node in a tree is called the root node. Being the topmost node, the root node will not have parents. As shown in FIG. 2, deserializer 116 operates to deserialize first version 102 and second version 104 into first memory model representation 102a and second memory model representation 104a respectively, and to store these memory model representations in memory model 112.

The memory model representations generated by deserializer 116 operate to automatically create a mapping relationship between the elements of the XML documents of the input versions that is sufficiently flexible to satisfy the requirements of the syntactical and semantical comparison performed by compare module 114, as will be described in greater detail below. In the representation form maintained in memory model 112, each XML element of a represented document corresponds to a tree node in the representation. Each such tree node has a context that contains: (a) the attributes of the corresponding XML element; (b) all descendent XML elements (and their respective attributes) of the corresponding element; and (c) a unique identifier for the node. By this definition, it can be seen that node contexts are hierarchical. The children of a node are the elements contained in the element corresponding to the node.

To account for the fact that some XML documents can be provided with a semantic for which order is not important for some or all of the elements, the memory model representations employ the concept of the unique identifier to identify counterpart elements across documents. Unique identifiers provide a reliable marker for compare module 114 to access when tracking changes made to elements of the software artifact code between versions that ensures that element contents are compared under the correct corresponding parent element. A unique identifier for a node includes the name of the corresponding element and zero or more attribute values of the corresponding element. To generate the unique identifier of each node context, deserializer 116 employs a repository of identifier determination rules that are applied to each of the XML elements according to the values of one or more attributes of the element.

In exemplary embodiments, deserializer 116 can be implemented to provide a pluggable framework for the repository of identifier determination rules for generating the unique identifiers that supports easy addition and modification of identifier determination rules. For example, the unique identifiers for each node can be generated according to any suitable implementation of alternative identifier determination rules that allow for each node to be distinctly identified without relying on the name and/or attributes of the corresponding element. The generation of unique identifiers performed by deserializer 116 is dependent upon the identifier determination rules in the pluggable repository. Thus, deserializer 116 is flexible in that a user can control the details of identifier determination and thereby tailor the unique identifiers to meet the requirements of specific applications.

Under the memory model of the present exemplary embodiment, sibling nodes cannot have the same unique identifier. To satisfy this requirement, deserializer 112 can be configured to generate unique identifiers that have different composite sets of attribute values for different corresponding element types. Thus, the memory model representations, there can be two different forms of unique identifiers. In the first type, the name of the XML element represented by the node is used without any attribute values to form the unique identifier. In such a case, it is expected that only one node context of this type occurs within the memory model representation of each version. In the second type of unique identifier, the name of the XML element represented by the node and each value of one or more attributes of the element are used to form the unique identifier. In such a case, there may be more than one node with this element name contained within the memory model representation of each version, and the values of the one or more selected attributes in the unique identifiers are used to distinguish each node.

It is not required that the values of all the attributes for an XML element be included in the unique identifier for the node corresponding to the element as long as the values or the combinations of values are unique to a parent node and each descendent node under the parent separately. To this end, element monitor 110, in addition to otherwise ensuring that each memory model representation is well formed, is configured to validate that each unique identifier in the memory model representation of each document is unique within the generated representation.

The unique identifiers having composite sets of attribute values provide for a flexible, reliable, and transparent mechanism for use by compare module 114 in performing the comparisons to accurately determine the differences between two versions of a software artifact by taking into consideration the semantics of the document. Under the memory model, an element in an XML document of first version 102 is considered a counterpart of another element in an XML document of second version 104 if the corresponding nodes for both elements have the same unique identifiers in the memory model representations of the versions. Counterpart elements are identical if their corresponding nodes have the same unique identifier and equivalent values for each of the corresponding attributes in the composite attribute set.

The unique identifiers must remain consistent between the versions of the software artifact provided by the vendor. Customers that make modifications to a version of the software artifact, however, are not required to have unique identifiers defined for elements they add or customize. When a customer changes any part of an element used to generate a unique identifier for the node corresponding to the changed element, this will have the same effect in merge solution tool framework 100 as if that element were deleted in the new version and then added as new element to the new version. This can be used as a way for the customer to provide an indication within a memory model node corresponding to an element of a represented document that they do not desire to have any updates that the vendor provides for that element mergedt.

Compare module 114 employs a pluggable repository of comparison rules for performing the comparison between the memory model representations of the documents to determine the differences therebetween. To identify the "same" node in two different memory model representations, the comparison rules are configured to be applied to link counterpart nodes (that is, nodes having the same unique identifier in the two representations being compared) in the two representations of the versions of the software documents being compared and to generate information about the differences between the elements corresponding to the counterpart nodes in the two versions during the comparison. In exemplary embodiments, compare module 114 can be implemented to provide a mechanism through which additional rules can be added to the pluggable repository of comparison rules so that more information about the differences between the elements of the each documents of the versions of the software artifacts being compared can be determined. The comparison performed by compare module 114 is dependent upon the comparison rules in the pluggable repository. Thus, compare module 114 is flexible in that a user can control the details of the comparison and thereby tailor the information generated in particular comparisons to meet the requirements of specific applications.

Figure 3:
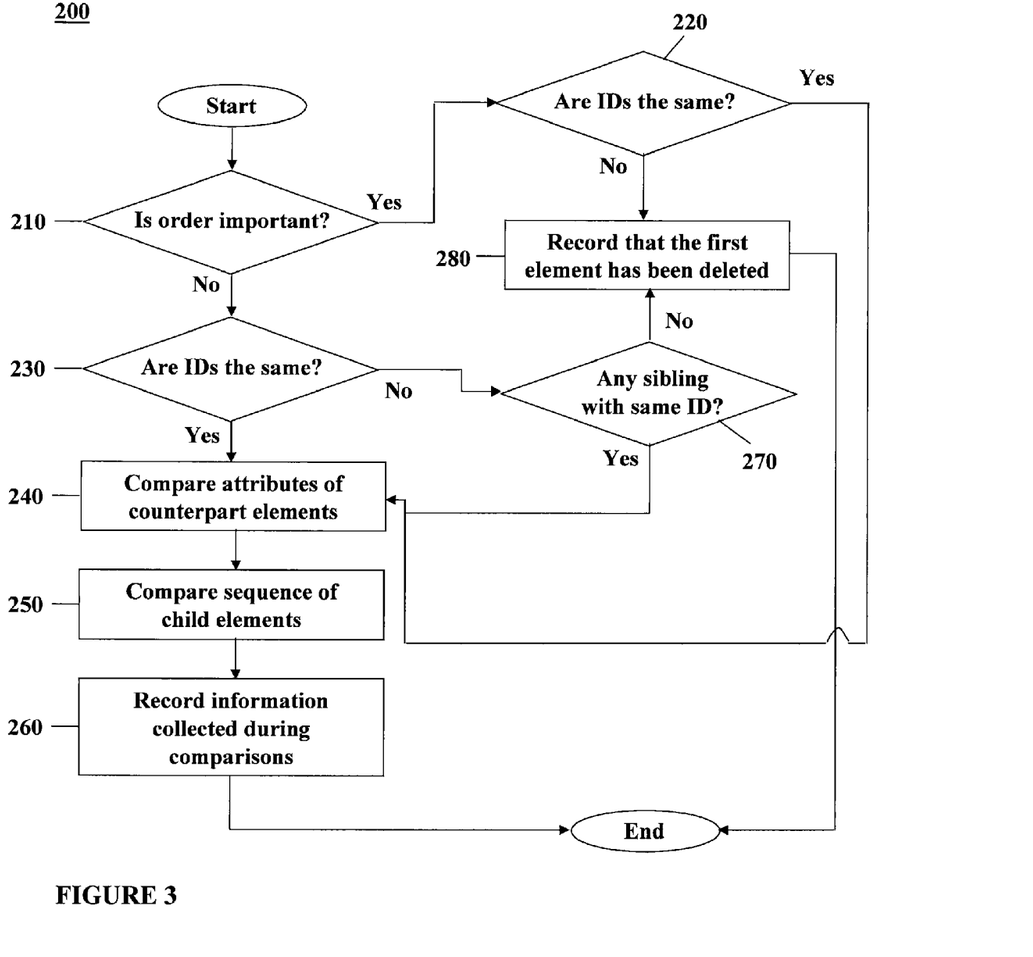
FIG. 3 is a flow diagram illustrating an exemplary embodiment of a process for comparing two XML elements in two different XML files in accordance with the present invention.

Referring now to FIG. 3, a flow chart illustrating an exemplary embodiment of a process 200 that may be performed by compare module 114 for comparing two XML elements in two different XML documents to determine their differences by accessing the contexts of nodes corresponding to those elements in the memory model representations of the versions being compared is provided. To perform such a comparison between versions, compare module 114 can be configured to repeatedly perform exemplary process 200 to compare each element in the first version once with each element in the second version, and thereby explore all possible top-level element additions, deletions, and other changes between the two versions.

Exemplary process 200 begins at decision block 210 by determining if the XML documents of the software artifact containing the elements being compared are provided with a semantic specifying that order is not important for the elements. If the XML documents are provided with a semantic specifying that order is important, process 200 proceeds to decision block 220 and determines if the respective unique identifiers for the nodes corresponding to the elements in the memory model representations for the versions being compared are the same. If it is determined at decision block 220 that the respective unique identifiers are not the same, process 200 proceeds to block 280 and records that the first element being compared does not exist in the version containing the second element being compared. Process 200 then terminates. If it is determined at decision block 210 that the XML documents of the application package are provided with a semantic specifying that order is not important for the elements, process 200 proceeds to decision block 230 and determines if the respective unique identifiers for the nodes corresponding to the elements in the memory model representations for the versions being compared are the same.

If it is determined either at decision block 220 or at decision block 230 that the respective unique identifiers for the nodes corresponding to the two elements being compared are the same, the two elements being compared are counterpart elements, and process 200 proceeds to block 240. At block 240, the attributes of the two counterpart elements, as provided in the memory model representation contexts of the nodes corresponding to the elements, are compared to identify any added attributes, identify any deleted attributes, and identify any attributes with changed values. Process 200 then proceeds to block 250, at which the sequences of the child elements of the two counterpart elements, as provided in the memory model representation contexts of the nodes corresponding to the elements, are compared based on the unique identifiers for the child elements to identify any differences in the child element sequences of the two counterpart elements. The information regarding the differences between the elements identified during the comparisons made at blocks 240-250 is recorded in the generic memory model at block 260.

If it is determined at decision block 230 that the respective unique identifiers for the nodes corresponding to the two elements being compared are not the same, process 200 proceeds to decision block 270, at which it is determined whether the unique identifier for the node corresponding to the first element being compared is the same as any of the unique identifiers for the nodes corresponding to the sibling elements of the second element being compared. If it is determined that the unique identifier for the node corresponding to the first element is the not same as any of the unique identifiers for the nodes corresponding to the sibling elements of the second element, process 200 proceeds to block 280 and records that the first element being compared does not exist in the version containing the second element being compared. If it is determined at block 230 that the unique identifier for the node corresponding to the first element is the same as the unique identifiers for a nodes corresponding to a sibling element of the second element, process 200 proceeds to block 240 and performs the comparisons described above at blocks 240 and 250 between the first element and the matching sibling element of the second element. The information regarding the differences between the elements identified during the comparisons made at blocks 240-250 is recorded in the generic memory model at block 260, and process 200 terminates.

Referring again to FIG. 2, upon completing the comparison between first version 102 and second version 104 by accessing context object 102*a* and context object 104*a* in data store 116, compare module 114 is configured to update the context objects in the memory model with at least the following information about the differences between the two documents identified by applying the comparison rules: (1) information about elements that have been deleted between versions; (2) information about elements that are associated with different parent elements in different versions of the same XML document; (3) information about elements that are associated with one parent element and exist in one XML document in one version and are associated with a different parent element and exist in a different XML document in the other version; (4) information about elements that are associated with one parent element and exist in one XML document in one version and are associated with the same parent element and exist in a different XML document in the other version; and (5) information about elements that have been renamed in the updated version. These five information sets represent the situations for which an element that is present in current version 102 no longer exists or is structured differently in the new version 104. These situations can commonly result from code refactoring.

Referring again to the exemplary embodiment of merge solution tool framework 100 depicted in FIG. 1, merging resources 120 is implemented to communicate with data store 116 of element monitor 110 to receive the recorded context information stored in the memory model corresponding to each element that is present in current version 102 and does not have a complementary element in new version 104, and to instantiate and store a customization mapping information XML element for each of these modified elements, as this customization mapping information is generated, to use when merging customizations from the first version into the new version. For each modified element, the corresponding customization mapping information XML element is formatted to contain six fields: (1) the file name for first version 102; (2) the location of the modified element in first version 102; (3) a merging solution key; (4) the file name for second version 104; (5) the location in second version 104 at which customizations are to be merged; and (6) any additional description or comments provided by the developers such as, for example, descriptions of any code refactoring rules applied between the two versions, the particular reasons for performing the refactoring, or particular instructions for merging customizations for the element. The values for both the location of the modified element in first version 102 and the location in second version 104 at which customizations are to be merged are provided in XPATH format.

Figure 4:
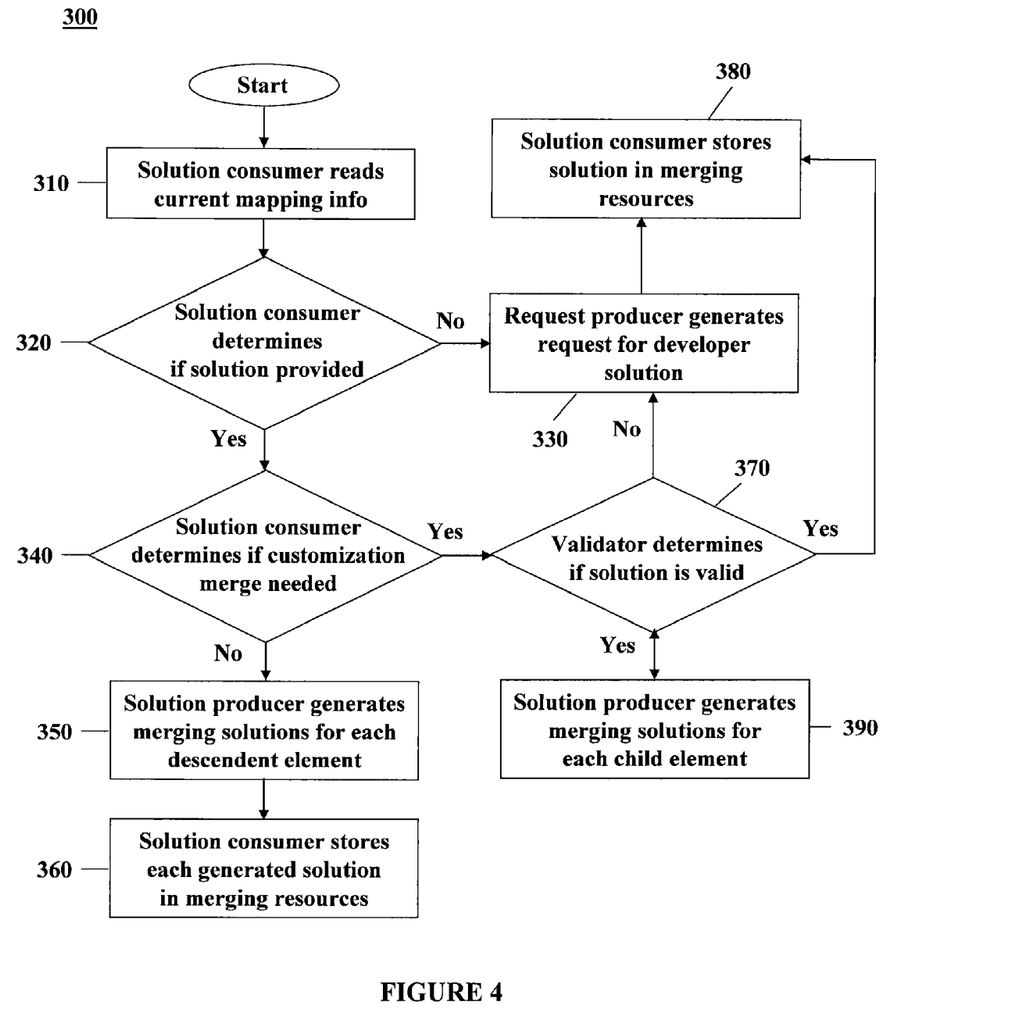
FIG. 4 is a flow diagram illustrating an exemplary embodiment of a process for generating a merge solution tool in accordance with the present invention.

The process for generating the merge solutions performed during the operation of merge solution tool framework 100 of the present exemplary embodiment will now be described with reference to the flow chart illustrated in FIG. 4. The process, indicated generally by reference number 300 in FIG. 4, is performed by merge solution tool framework for each customization mapping information XML element instantiated by merging resources 120. Prior to performing process 300 on any of the mapping information elements instantiated by merging resources 120, the only fields specified for each element are the file name for first version 102, the location of the modified element in first version 102, and any additional description or comments provided by the developers. For each mapping information element, the merging solution key can be set to either DO_NOT_MERGE, which indicates that the customizations made to this element in first version 102 need not be reapplied in second version 104, or MERGE_TO_NEW_INSTANCE, which indicates that customizations made to this element in first version 102 should be merged to a new location in second version 104.

At block 310 of process 300, solution consumer 160 reads the current mapping information element from merging resources. At decision block 320, solution consumer 160 analyzes the mapping information element to determine whether a customization merge solution is provided in the element. That is, solution consumer 160 determines whether the values for the mapping information element fields for the merging solution key, the file name for second version 104, and the location in the second version at which customizations are to be merged have been specified. If no customization merge solution is provided, at block 330, request producer 150 generates a request for the application developers to provide the merge solution for the element by specifying values for the fields analyzed at decision block 320. The request can be provided, for example, through a user interface implemented within merge solution tool framework 100 that is accessible by the developer through a computer system on which the tool framework is running, and the request can indicate the already specified values for the file name for first version 102, the location of the modified element in first version 102, and any additional description or comments provided by the developers. Generally, if the element corresponding to the mapping information element existed in first version 102 but was deleted during development of second version 104 or is otherwise not customizable in the second version, the developer will set the merging solution key to DO_NOT_MERGE. Otherwise, the merging solution key will generally be set by the developer to MERGE_TO_NEW_INSTANCE. After receiving this developer input, the process proceeds to block 380, at which the merging solution information is stored by solution consumer 160 in the corresponding mapping information element maintained merging resources 120, and the process terminates.

If a customization merge solution is found by solution consumer 160 at decision block 320, the solution consumer then, at decision block 340, determines whether customizations to the element corresponding to the mapping information element need to be merged. That is, solution consumer 160 reads the value of the merging solution key. If the key is set to DO_NOT_MERGE, at block 350, solution producer 140 generates customization merging solutions in mapping information format for each descendent element of the element corresponding to the current mapping information element by specifying the merging solution key for descendent element to DO_NOT_MERGE. Process 300 then proceeds to block 360, at which the generated solutions for each of the descendant elements are stored by solution consumer 160 in the corresponding mapping information elements in merging resources 120. The process then terminates.

If, at decision block 340, the merging solution key for the current mapping information element is set to MERGE_TO_NEW_INSTANCE, at decision block 370, validator 130 accesses the element specified by the fields of the current mapping information element for the file name for second version 104 and the location in the second version at which customizations are to be merged and performs validation on the result of the customization merging solution in second version 104 according to the semantic provided for the XML documents of the software artifact. If the solution is validated at decision block 370, the process proceeds to block 380, at which the solution is stored by solution consumer 160 in the corresponding mapping information element in merging resources 120. The process then proceeds to block 390, at which solution producer 140 generates customization merging solutions in mapping information format for each child element of the element corresponding to the current mapping information element, and, as indicated in FIG. 4, exemplary process 300 is recursively instantiated and performed beginning at decision block 370 for each child element of the element corresponding to the current mapping information element. If the customization merging solution for the current mapping information element is not validated at decision block 370, the process proceeds to block 330, at which request producer 150 generates a request for the application developers to provide the merge solution for the element as described above, and the process terminates.

Referring again to the exemplary embodiment of merge solution tool framework 100 illustrated in FIG. 1, once the system has generated the merge solutions for each element that exists in current version 102 and does not have a complementary element in new version 104, the framework generates the interfaced versions of the merging solutions in merging interface 170. To do so, solution consumer 160 is implemented to access merging resources 120 and wrap the merging solutions in an API that can be accessed by a migration tool for performing the upgrade from current version 102 to new version 104 to merge customizations made by the customer to elements in the current version that does not have a complementary element in the new version while the upgrade is performed. The API of merging interface 170 can include a MergingInterface.getTargetElement( ) object and a MergingInterface.getTargetFile( ) object for accessing merging resources 120 to obtain the file name for second version 104 and the location in the second version at which customizations are to be merged when an element that has been customized by the customer in current version 102 is identified by the migration tool.

Merging resources 120 and merging interface 170 can be delivered alongside the software tool that is configured to perform the migration from current version 102 to new version 104, and thereafter used by customers to merge their customizations made to the current version when migrating to the new version. In some exemplary embodiments, merging resources 120 and merging interface 170 can be configured to be implemented within the corresponding migration tool for migrating from current version 102 of the software artifact to new version 104. Merging resources 120 and merging interface 170 may be implemented as an aspect of a software package for the corresponding migration tool, or as a software module or component implemented for incorporation with the corresponding migration tool as, for example, one or more libraries of functions, one or more plug-in or extension modules, one or more dynamic link-libraries, etc.

As discussed above, exemplary embodiments of the present invention can be implemented to generate a tool for automatically merging customizations made to software artifacts comprising code in structured documents of any type, not just XML-language documents. In the present exemplary embodiment, only deserializer 116 is implemented under the assumption that it is working with documents having an XML construct, while each of the other actor and handler modules described are working with context objects of the generic, hierarchical memory model. Thus, in alternative exemplary embodiments, merge solution tool framework 100 can be extended to handle non-XML languages, for example, in either of the following two ways: (1) replacing deserializer 116 with a handler that understands non-XML languages; or (2) implementing a preprocessor to convert a non-XML language to an XML format. Furthermore, in exemplary embodiments, the documents of the software artifact versions and the memory model representations of the versions may each observe different syntax rules, and the nodes of the memory model representations can be generated utilizing a mechanism that is appropriate to the particular type of documents and elements being compared. For example, the documents of the software artifact versions may have an HTML-language construct, while the memory model representations may have an XML language construct.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be implemented using one or more program modules and data storage units. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 5:
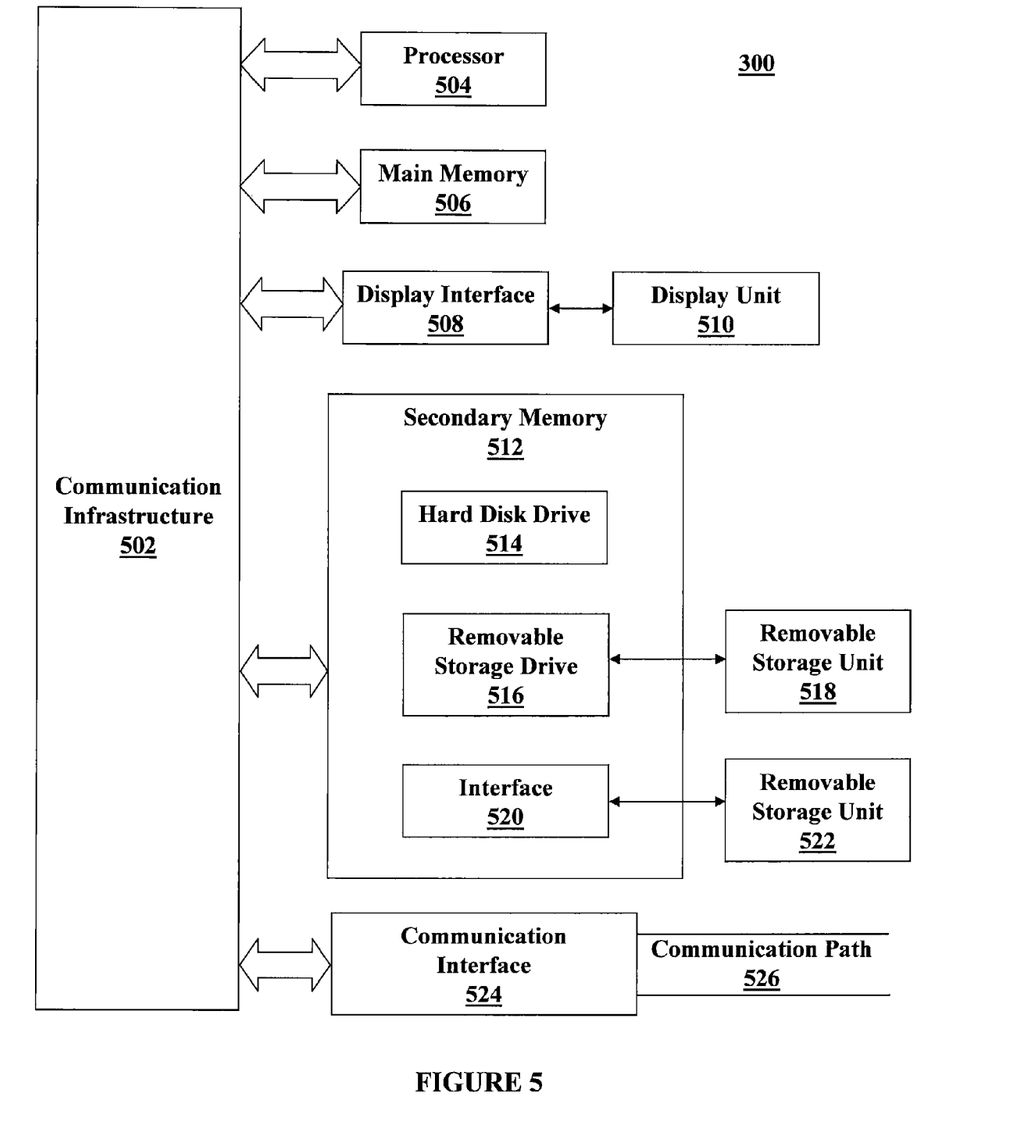
FIG. 5 is a block diagram illustrating an exemplary computer system that can be used for implementing exemplary embodiments of the present invention.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, the present description is not intended to be exhaustive or limiting of the invention to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the present invention.

The invention claimed is:

1. A method of generating a tool for merging customizations made to a first version of a software artifact when migrating to a second version of the software artifact, the method comprising:

instantiating a mapping information element in a first data store for each top-level data element in a first code set for the first version that does not have a complementary data element in a second code set for the second version;

requesting merge instructions for each top-level data element in the first code set for which merge instructions are not provided in the corresponding mapping information element for the top-level data element;

receiving merge instructions for each top-level data element in the first code set for which merge instructions are not provided;

determining whether the merge instructions for each top-level data element in the first code set for which merge instructions are provided require that customizations made to the top-level data element be merged into the second code set;

determining whether the merge instructions for each top-level data element in the first code set that requires customizations made to the top-level data element to be merged are valid;

requesting merge instructions for each top-level data element in the first code set for which the merge instructions are not determined to be valid;

receiving merge instructions for each top-level data element in the first code set for which the merge instructions are not determined to be valid; and storing the merge instructions received for each top-level data element in the first code set in the corresponding mapping information element in the first data store.

2. The method of claim 1, further comprising generating a mapping information element in the first data store for each descendent data element of each top-level data element in the first code set that does not have a complementary data element in the code set for the second version.

3. The method of claim 2, further comprising generating merge instructions for each descendent data element of each top-level data element in the first code set that does not require customizations made to the top-level data element to be merged specifying that customizations made to the descendent data element do not need to be merged, and storing the merge instructions generating for each descendent data element of each top-level data element in the first code set that does not require customizations made to the top-level data element to be merged.

4. The method of claim 2, further comprising storing the merge instructions for each top-level data element in the first code set for which the merge instructions are determined to be valid in the corresponding mapping information element in the first data store.

5. The method of claim 4, further comprising generating merge instructions for each child data element of each top-level data element in the first code set for which the merge instructions are determined to be valid, determining whether the merge instructions for each child data element of each top-level data element in the first code set for which the merge instructions are determined to be valid, requesting merge instructions for each child data element of each top-level data element in the first code set for which the merge instructions are not determined to be valid, receiving merge instructions for each child data element of each top-level data element in the first code set for which the merge instructions are not determined to be valid, storing the merge instructions received for each child data element of each top-level data element in the first code set for which the merge instructions are not determined to be valid in the corresponding mapping information element in the first data store, and storing the merge instructions for each child data element of each top-level data element in the first code set for which the merge instructions are determined to be valid in the corresponding mapping information element in the first data store.

6. The method of claim 5, further comprising generating merge instructions for each descendent data element of each top-level data element in the first code set that does not require customizations made to the top-level data element to be merged specifying that customizations made to the descendent data element do not need to be merged, and storing the merge instructions for each descendent data element of each top-level data element in the first code set that does not require customizations made to the top-level data element to be merged.

7. The method of claim 6, further comprising wrapping the mapping information elements in the first data store in an application programming interface to provide functionality that can be accessed when migrating the first code set to the second code set to merge customizations made to each data element in the first code set that does not have a complementary data element in the second code set according to the corresponding mapping information element for the data element.

8. The method of claim 7, wherein the mapping information elements and the application programming interface are configured to be incorporated within a migration tool configured to perform migration of the first code set to the second code set.

9. The method of claim 1, wherein each mapping information element in the first data store includes a first field for a first name value of a first file of the first code set in which the corresponding data element is located, a second field for a first location value in the first file at which the corresponding data element is located, a third field for a key value indicative of whether customizations made to the corresponding data element in the first code set should merged into the second code set, a fourth field for a second name value of a second file of the second code set in which customizations to the corresponding data element are to be merged, and a fifth field for a second location value in the second file at which customizations to the corresponding data element are to be merged.

10. The method of claim 1, further comprising comparing the first code set with the second code set to identify each top-level data element in the first code set for the first version that does not have a complementary data element in the second code set.

11. The method of claim 9, wherein comparing the first code set with the second code set comprises deserializing the first code set into a first context object that includes a context element for each data element in the first code set identified by a unique identifier for the data element, deserializing the second code set into a second context object that includes a context element for each data element in the second code set identified by a unique identifier for the data element, and comparing each context element in the first context object with each context element in the second context object.

12. The method of claim 1, wherein the first code set and the second code set comprise documents written in a structured programming language selected from SGML, XML, HTML, WML, XHTML, DHTML, other SGML derivatives, and user interface markup languages.

13. The method of claim 12, wherein the first code set and the second code set comprise XML-language documents for which no XML schema has been provided, wherein each data element in the first code set is an XML element, and wherein each data element in the second code set is an XML element.

14. The method of claim 1, wherein the software artifact is one or more of software components, system architectures, application packages, analysis models, design models, design patterns, database schemas, and web services.

15. The method of claim 1, wherein the method of generating the tool for merging customizations is performed at regular intervals during development of the second version of the software artifact.

16. The method of claim 1, wherein code refactoring has been performed on the first code set to produce the second code set.

17. The method of claim 1, wherein requesting and receiving merge instructions for a data element comprises generating a merge instruction request via a user interface and receiving a merge instruction specification provided by user input via the user interface.

18. A computer-usable medium having computer readable instructions stored thereon for execution by a processor to perform a method of generating a tool for merging customizations made to a first version of a software artifact when migrating to a second version of the software artifact, the method comprising:
  instantiating a mapping information element in a first data store for each top-level data element in a first code set for the first version that does not have a complementary data element in a second code set for the second version;
  requesting merge instructions for each top-level data element in the first code set for which merge instructions are not provided in the corresponding mapping information element for the top-level data element;
  receiving merge instructions for each top-level data element in the first code set for which merge instructions are not provided;
  determining whether the merge instructions for each top-level data element in the first code set for which merge instructions are provided require that customizations made to the top-level data element be merged into the second code set;
  determining whether the merge instructions for each top-level data element in the first code set that requires customizations made to the top-level data element to be merged are valid;
  requesting merge instructions for each top-level data element in the first code set for which the merge instructions are not determined to be valid;
  receiving merge instructions for each top-level data element in the first code set for which the merge instructions are not determined to be valid; and
  storing the merge instructions received for each top-level data element in the first code set in the corresponding mapping information element in the first data store.

19. A data processing system comprising:
at least one processor;
a random access memory for storing data and programs for execution by the at least one processor; and
computer readable instructions stored in the random access memory for execution by the at least one processor to perform a method of generating a tool for merging customizations made to a first version of a software artifact when migrating to a second version of the software artifact, the method comprising:
instantiating a mapping information element in a first data store for each top-level data element in a first code set for the first version that does not have a complementary data element in a second code set for the second version;
requesting merge instructions for each top-level data element in the first code set for which merge instructions are not provided in the corresponding mapping information element for the top-level data element;
receiving merge instructions for each top-level data element in the first code set for which merge instructions are not provided;
determining whether the merge instructions for each top-level data element in the first code set for which merge instructions are provided require that customizations made to the top-level data element be merged into the second code set;
determining whether the merge instructions for each top-level data element in the first code set that requires customizations made to the top-level data element to be merged are valid;
requesting merge instructions for each top-level data element in the first code set for which the merge instructions are not determined to be valid;
receiving merge instructions for each top-level data element in the first code set for which the merge instructions are not determined to be valid; and
storing the merge instructions received for each top-level data element in the first code set in the corresponding mapping information element in the first data store.

* * * * *